July 19, 1966 J. S. JUDGE 3,261,770

SALT SOLUTION CONTACT ACTIVATOR AND SCRIBER FOR ELECTROPLATING ON A CONTINUOUS FILM AND METHOD OF USING THE SAME

Filed June 29, 1962

INVENTOR

JOHN S. JUDGE

BY Bernard M. Goldman

ATTORNEY 3,261,770

SALT SOLUTION CONTACT ACTIVATOR AND SCRIBER FOR ELECTROPLATING ON A CONTINUOUS FILM AND METHOD OF USING THE SAME

John S. Judge, Wappingers Falls, N.Y., assignor to International Business Machines Corporation, New York, N.Y., a corporation of New York Filed June 29, 1962, Ser. No. 206,307
2 Claims. (Cl. 204—28)

This invention relates to means for conveying electric current to the conducting surface of a moving web to electroplate it.

The contact provided by this invention is particularly useful in the manufacture of plated magnetic tape for conveying current to a tape web having a very thin and highly resistive conducting surface. Such web may comprise a conductive surface which is a metal film applied to a plastic carrier or substrate, such as a Mylar carrier, by chemically plating (electrolessly plating) the surface of the plastic carrier after pretreating it preferably in the manner described in U.S. patent application Serial No. 138,609, filed September 18, 1961, now Patent No. 3,142,581, or Serial No. 153,187, filed November 17, 1961, now Patent No. 3,142,582, both of which are assigned to the assignee of the present application. Since the pretreating and chemical plating operations are done prior to applying the present invention, they are not disclosed in detail herein. The electrolessly plated layer provides a means for conducting current for a subsequent electroplating operation on the tape and also provides adhesion for the final electroplated surface to the plastic carrier.

A final electroplated surface with properties for magnetic recording is applied to the electroless metal surface by electroplating a magnetic film such as cobalt or cobalt-nickel upon the electroless surface. A controlled electroplated surface can present very desirable magnetic recording properties, and it can withstand abrasion to the point of providing a very long wearing surface in spite of frequent starting, stopping and rubbing with respect to a read/write head in a magnetic tape transport.

It is exceedingly important that the final electroplated surface be substantially flawless in order to avoid the possibility of recording errors on the magnetic surface. Therefore, rough, burned, significant pinhole areas, or other imperfections cannot be tolerated on the electroplated surface. When a dry-tape contact is used, such as the common roll contact, it is essential that the tape surface to be plated be completely cleaned and dried after the wet electroless plating. Otherwise undesirable results may occur such as irregular deformation of the roll surface due to deplating of the electroless metal to the roll surface that can create high spots, which can destroy the uniformity of electric current distribution after relatively short usage, and which can adversely affect the resultant magnetic tape properties. Thus with the prior dry-type contact, it is essential to clean and dry the surface to be plated prior to applying it to the dry-type contact, in order to obtain maximum contact life and to avoid adverse effects to a tape surface. An intervening drying operation slows down the production rate of tape manufacturing, and/or increases production costs by requiring expensive drying equipment.

It is, accordingly, an object of this invention to provide a plating contact which can directly convey current to a wet surface to be electroplated in a subsequent plating bath. Hence no preliminary drying step is needed when the invention is used.

With the wet-type contact of this invention, a uniform contacted surface is provided over the engaged area, and a uniform amount of very slight deplating occurs over the electroless surface of the tape which cleans the surface for subsequent electroplating. This can eliminate the preliminary step of cleaning and activating the surface to be plated.

It is thus a further object of this invention to provide a contact which not only conveys electric current to a metallic surface to be plated, but simultaneously cleans and activates the surface for a following electroplating operation.

Generally a preliminary electroless plating operation covers all surfaces of a plastic carrier that was continuously passed through the electroless plating bath. Accordingly, both flat sides and both edges of the web have electrolessly plated metal. However, it may be desirable in a subsequent electroplating operation to electroplate only on the one side of the web which is to be used as a magnetic recording surface in order to conserve electroplating metal and electric power.

It is another object of this invention to provide a wet contact which can control the conveyance of current to one side of a web to be electroplated by controlling a fluid level in this contact.

It is a further object of this invention to provide a fluid contact which not only conveys electric current to a resistive tape surface to be electroplated, but which can simultaneously scribe (remove) the electroless plated edges on a web in order to prevent the movement of current from the side to be electroplated around the edges to the opposite side, which would otherwise cause parasitic plating on the second side. Hence, the invention can provide precisely controlled electroplating on only one side of the web where required.

It is another object of this invention to provide a contact that obtains cooling of the contacted surfaces of a workpiece so that more current can be applied to the conductive workpiece than can be applied by a dry contact.

It is another object of this invention to provide a contact which cools the workpiece by imparting an evaporative liquid film to it after it leaves the contact and while the workpiece is being transported through the air to the plating bath, during which time current flows through the thin resistive electroless surface to heat it. A higher maximum current can be carried under these circumstances to obtain maximum electroplated thickness.

This invention comprises an ionically conductive contact liquid, such as a salt solution, which may be the same solution as contained in the plating bath or a different solution which is compatible with the bath solution. The contact liquid is supported insulatingly from the bath. A current-conveying means engages the ionically conductive contact fluid. If scribing is required, the current-conveying means has at least a part located adjacent to one or both edges of the tape to be scribed as it passes through the contact. The current-conveying means is connected to the negative terminal of a current source. One side of the tape can be masked from the contact liquid in order to convey current to one side of the tape for plating only on one side.

The foregoing and other objects, features and advantages of the invention will be apparent from the following more particular description of a preferred embodiment of the invention, as illustrated in the accompanying drawings.

Figures 1, 2:
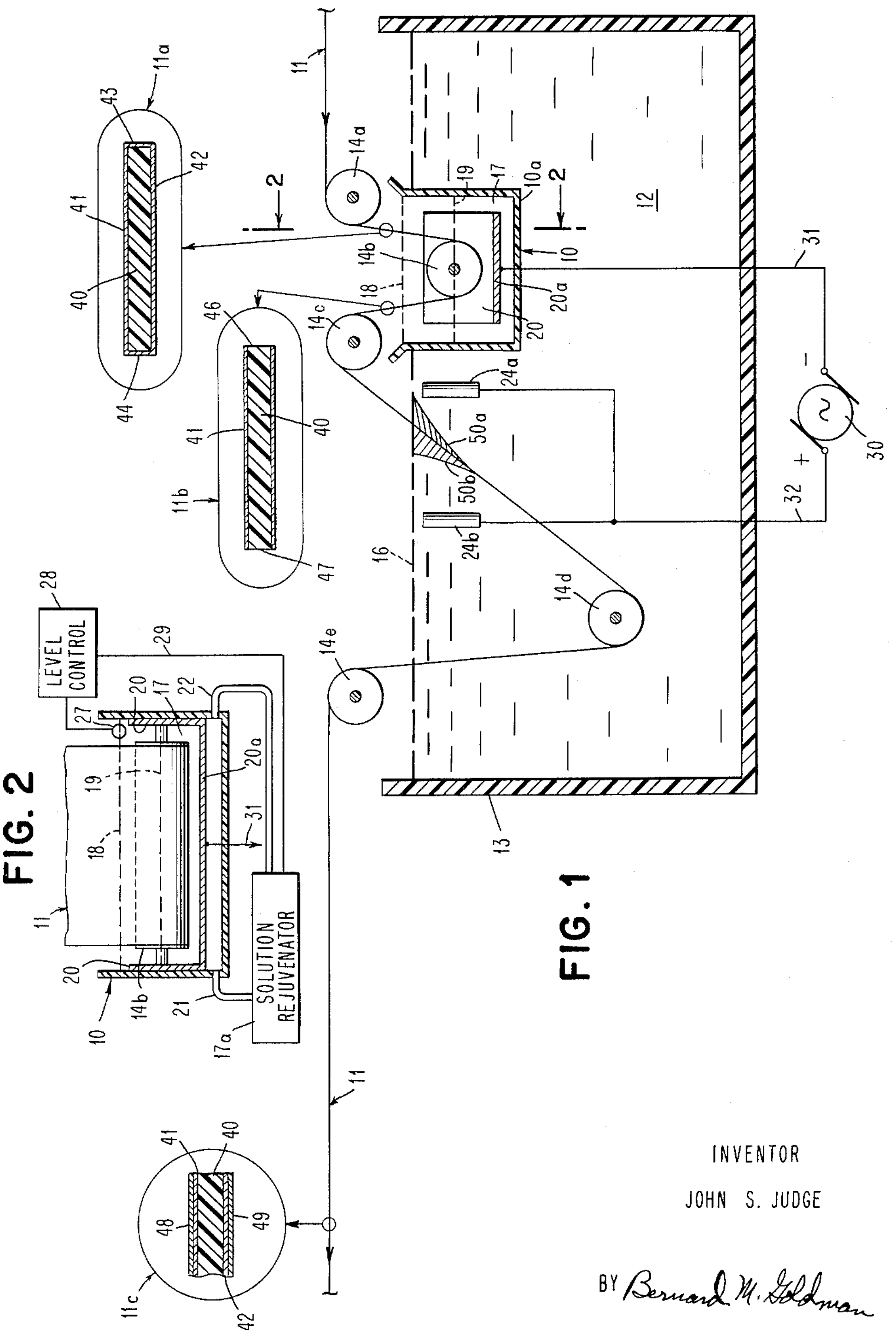
FIGURE 1 illustrates a sectional elevation view with magnified sections of an embodiment of the invention.
FIGURE 2 illustrates section 2—2 of the contact shown in FIGURE 1.

In FIGURE 1, a fluid contact 10 is shown partly submerged in a plating bath 12 supported within an insulating container 13.

A path taken by a web 11 to be electroplated is over a roll 14*a*, through contact means 10, over a roll 14*c*, and into a plating solution 12 in which it passes under roll 14*d*, and out of the plating solution over a roll 14*e*. A magnified cross-section 11*a* illustrates the electroless metal coating on web 11 before it enters contact 10. In 11*a*, web 11 comprises a plastic substrate 40, preferably Mylar plastic, with previously electrolessly plated metal on both flat surfaces 41 and 42 and both edges 43 and 44 by a method such as described in U.S. Patent No. 2,658,841 to Gutzeit et al. after prior preparation by either of the above-cited U.S. patent application Nos. 138,609, now Patent No. 3,142,581, or 153,187, now Patent No. 3,142,582, followed by the method described in Bergstrom U.S. Patent No. 2,702,253. One or more of the rolls may be driven to continuously move the web through the contact and bath.

Contact means 10 comprises an insulating container 10*a* which electrically separates a conducting liquid 17 within contact means 10 from the plating bath liquid 12. Contact means 10 includes a roll 14*b* which receives on its underside the web 11 prior to an electroplating operation upon the web 11. A current-conveying plate 20*a* has a pair of metallic conducting plates 20, best shown in FIGURE 2, supported at the sides of contact 10 adjacent to the opposite edges of tape 11. For scribing it is important that plates 20 be located adjacent the edges of web 11. If no scribing is required, no side plates 20 are provided and only the part parallel to roll 14*b* near the bottom of container 10*a* is provided. The latter case therefore provides a contact with activation but without scribing. The current-conveying means 20–20*a* is connected electrically to the negative side 31 of a current source 30, which has its positive sides connected to anodes 24*a* and *b* in the electroplating bath.

The salt solution 17 within contact 10 may be the same type of salt solution that exists in plating bath 12. Since contact means 10 is a pre-contact, a film of solution 17 will cling to the surface of web 11 as it leaves roll 14*b* and moves toward plating solution 12. Thus, solution 12 will receive continuously an amount of solution 17 due to the conveyance of tape 11. Thus, solution 17 must be compatible with solution 12, if it is a different type of solution. Hence, solution 17 may be different from solution 12 as long as it does not undesirably contaminate the solution 12.

An input line 22 carries fresh conductive salt solution 12 from a solution rejuvenator 17*a* into contact 10, and an output line 21 conveys used-salt solution 17 to rejuvenator 17*a*. Thus, lines 22 and 21 and rejuvenator 17*a* permit continuous rejuvenation of contact solution 17. Rejuvenator 17 is presumed to used conventional rejuvenating techniques. Generally, the salt solution within contact 10 should be buffered and have a pH between 1 and 4. A float 27 pivoted from a level control 28 that connects to rejuvenator 17*a* maintains a preset solution level in contact 10. Level control 28 develops an output signal on line 29 that controls the rate of addition or subtraction of solution 17 to maintain level 18 at the predetermined level.

Roll 14*b* may be conducting, such as where it is made of metal (stainless steel); but preferably roll 14*b* is nonconducting, such as where it is made of plastic resin, ceramic or glass. It is considered preferable in this disclosure to have roll 14*b* made of an insulating material since single surface plating can be done with an insulating roll, and a conducting metallic roll 14*b* may eventually be deformed after a substantial amount of use due to transference of metal to it from the tape surface. However, deformation of such roll in the fluid contact is not as serious as deformation of a dry-type roll contact, because conduction will still primarily occur through the fluid rather than through high spots on the roll that is characteristic of the dry-type roll contact.

If roll 14*b* is made of insulating material, the plating on one or both sides of web 11 can be controlled by the level of liquid 17 in contact 10. Thus, if liquid 17 is at or below level 19 in FIGURE 1, current is conveyed by solution 17 only to the outer surface 42 of web 11 passing around roll 14*b*. The inner surface 41 of web 11 engages roll 14*b* and cannot contact the solution below level 19. Since the inner surface 41 does not receive current, plating is inhibited on that side of the web after it reaches bath 12. If the metallic edges of the tape are not scribed (removed), some of the current will creep around the opposite side to cause some parasitic plating, however.

On the other hand, if fluid 17 is raised above level 19 such as to a level 18, then current is conveyed through the solution 17 to both sides of web 11 before it leaves contact 10, and thus plating is provided symmetrically on both sides of web 11 within bath 12.

A deplating operation occurs to the electroless metal surface of web 11 within contact means 10 as opposed to the plating action occurring on the electroless surface within bath 12, because opposite current flows occur to the surface of web 11 in contact means 10 and in plating bath 12. In contact 10, the negative side of source 30 is connected to current-conveying plates 20 and there is a slight potential drop across fluid 17 before the current leaves the surface of web 11. Thus, the web surface is positive with respect to current conveying plate 20–20*a*, which are thereby cathodic. Hence the current direction is from the web to plate 20–20*a*, which causes a deplating action on the surface of the web 11 in contact 10.

The location of current-conveying plate 20 at the sides of roll 14*b* controls the deplating of the electroless metal in a manner that obtains some highly desirable results, and the part 20*a* can be eliminated for maximum scribing action. First, a scribing action occurs along edges 46 and 47 of web 11 that is so vigorous due to the close proximity of plate 20 that all electrolessly plated material on edges 43 and 44 is totally removed. The scribing provides electrical insulation between the electroless surfaces 41 and 42 as shown in magnified view 11*b* in FIGURE 1. Accordingly, if it is desired to plate on one side of the tape: there is provided an insulating roll 14*b* and a solution at or below level 19, so that current is conveyed only to side 42 of the web and no current can flow around the edges of the web to the opposite side 41 as it moves toward plating bath 12. It is thereby possible to plate only on a single side of tape 11 without parasitic plating on the opposite side. There results a saving in electric power and electroplating material; and uniformity in solution 12 is more easily maintained.

Furthermore scribing can be desirable even for plating on both sides of web 11, because then plating on opposite sides of the web can be independently handled, such as for example using different potentials for anodes 24*a* and *b*.

A second advantage of deplating the electroless surface by contact 10 is to clean the surface by removing oxide films which can quickly form on the electroless surface prior to the web being received by contact 10. Such oxides would interfere with the electroplating operation and hence must be removed.

A third advantage of the deplating action on the flat sides 41 and/or 42 of web 11 is that it shapes the electroless layers proportionally thinner toward the edges of the web. This tends to increase the resistance to longitudinal current flow toward the edges of the web surfaces more than at the center of the surfaces. It has been discovered that electroplating on a web's electroless surface having uniform thickness results in an electroplated surface that is thicker toward the sides of the flat surfaces 41 and 42 than at its center. Consequently the result of proper shaping of the electroless base layer is to obtain a more uniform electroplating operation, which can obtain a tape with better magnetic recording and wearing properties.

The liquid nature of contact 10 makes it unnecessary to provide any drying of the tape 11 prior to passing it into contact 10. Hence, the electroplating can start as soon as electroless plating is complete without an intervening drying operation. The elimination of heating ovens needed for the drying step eliminates the cost of the ovens and the space they would occupy, and prevents the drying step from slowing down the tape manufacturing operation.

Furthermore, the fluid 17 conducts heat away rapidly so that a significantly greater amount of current can be conveyed to electroless surface without burning or adverse effect than could be applied by a dry-type roll contact.

Also, when the web 11 leaves contact 10 on its way to bath 12, it is carrying all of the current it received within contact 10. The current passing through a very resistive electroless surface 41 and 42 generates heat in that surface and raises its temperature. A liquid film is acquired on the web in contact 10, and the film provides evaporative cooling while the web is passing through the air to the bath and being heated by current. At any given web velocity, air temperature and humidity conditions, there will be a minimum "critical" length, beyond which it can be expected that the evaporative cooling film is gone. Thus more current can be carried by the web if the tape length between contact 10 and bath 12 is maintained below the "minimum" critical length. This also increases efficiency of power consumption since there is less power loss for a shorter web; and this results in a lower voltage requirement for source 30. Thus it is desirable that the web run in the air be maintained sufficiently short. Once the fluid evaporates, the current may heat to undesirably high temperatures that may damage the web, unless the current-carrying capacity of the web is degraded which reduces the electroplating thickness obtainable in bath 12.

As web 11 enters bath 12, it immediately dissipates current at a maximum current density on its surface, which current density decreases asymptotically to a negligible amount within one or two inches of the surface 16 of bath 12. The current-density distribution on the opposite sides of the web (assuming equal current on both sides) is illustrated respectively by curves 50*a* and 50*b*, the current density at any point on web 11 is proportional to the horizontal distance from either curve 50*a* or *b* to web 11 in FIGURE 1. This current distribution is explained in greater detail in prior U.S. patent application No. 165,806, now Patent No. 3,175,154 to H. Koretzky, B. Leland and R. W. Polleys, assigned to the same assignee as the present application. Anodes 24*a* and *b* are provided adjacent to the sides of the web near the fluid surface 16 where the current density substantially exists. If the tape is to be plated on only one side, then only anode 24*a* and current distribution 50*a* are provided.

The result of the electroplating operation is shown in cross-section by magnified cross-sectional view 11*c* in FIGURE 1 which shows electroplated surfaces 48 and 49 provided on the electrolessly-plated surfaces 41 and 42.

If the container 10*a* is made of conductive metal, it may serve the dual function of also being the current-conveying means; and separate plates 20–20*a* need not be provided. In this case, the negative terminal of source 30 is connected to the container, and it is insulatingly supported from bath 12.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus including a scribing device and negative electroplating contact for electrically separating front and back resistive cobalt-alloy surfaces previously coated on a plastic web, while selectively conducting current substantially entirely to the front metal surface, further comprising a following electroplating bath connected to a positive side of a current source for electroplating substantially on one side of said web, a container for said contact insulated from and immediately adjacent to said bath and for containing a contact solution of conductive salts for receiving therethrough said coated web, an insulating roll partially submerged in said contact solution for engaging said web, cathode-plates in said contact solution adjacent the ends of said roll and being connected to a negative side of said current source for activating the front metal coating, scribing the metal edges, and conveying current to the front metal coating on said web, and web supporting means positioned above said contact solution in relation to said insulating roll for engaging and disengaging the web from said insulating roll above the level of said contact solution to inhibit current from reaching the back metal coating of said web, whereby the electrical intensity distribution on said web caused by the proximity of said cathode plates removes substantially all metal on the edges of said web without substantially removing metal from either the front or back sides of said web.

2. A method of controlling the conduction of an electroplating current substantially along one side of a thin resistive layer of cobalt alloy initially coated on all sides of a plastic web comprising the steps of:

passing said web into a contact salt solution compatible with a following electroplating bath, insulating said contact solution from said bath except through a web metallic layer to force current substantially along said web, moving said web between a pair of plates adjacent the edges of said web in said contact-salt solution, connecting said plates to a negative terminal of a plating current source, removing metal primarily along the edges of said web with said current in said contact solution in order to electrically separate front and back metallic layers coated on said web, and engaging an insulating surface against the back of said web while it is in said contact-salt solution to inhibit current flow to the back metallic layer in order to activate and convey electroplating current only to the exposed front side of said web in said contact-salt solution for the subsequent electroplating operation in the following electroplating bath.

References Cited by the Examiner

UNITED STATES PATENTS

| | | | |
|---|---|---|---|
| 2,882,214 | 4/1959 | Summers et al. | 204—206 |
| 2,933,438 | 4/1960 | Laury | 204—206 |
| 2,936,278 | 5/1960 | Shoemaker et al. | 204—206 |
| 2,953,507 | 9/1960 | Palme | 204—206 |

FOREIGN PATENTS

| | | |
|---|---|---|
| 511,009 | 3/1955 | Canada. |

References Cited by the Applicant

UNITED STATES PATENTS

| | | |
|---|---|---|
| 1,068,410 | 7/1913 | Chubb. |
| 1,068,411 | 7/1913 | Chubb |
| 1,565,683 | 12/1925 | Swain. |
| 2,667,453 | 1/1954 | Murray. |
| 3,227,635 | 1/1966 | Koretzky et al. |

JOHN H. MACK, *Primary Examiner.*

H. S. WILLIAMS, *Examiner.*

W. VAN SISE, *Assistant Examiner.*